No. 738,291. PATENTED SEPT. 8, 1903.
P. H. CARLYON.
GOLD SAVING DEVICE.
APPLICATION FILED JAN. 3, 1900.
NO MODEL.

Witnesses
Inventor:
Philip H. Carlyon,
by Dodge and Sons,
Attorneys.

No. 738,291. Patented September 8, 1903.

UNITED STATES PATENT OFFICE.

PHILIP H. CARLYON, OF OLYMPIA, WASHINGTON.

GOLD-SAVING DEVICE.

SPECIFICATION forming part of Letters Patent No. 738,291, dated September 8, 1903.

Application filed January 3, 1900. Serial No. 277. (No model.)

*To all whom it may concern:*

Be it known that I, PHILIP H. CARLYON, a citizen of the United States, residing at Olympia, in the county of Thurston and State of Washington, have invented an Improved Gold-Saving Device, of which the following is a full, clear, and exact description.

My invention has for its object the construction of an improved apparatus for separating, extracting, and saving all pieces, particles, or grains of gold in a free state from sand, gravel, pulp, or other comminuted substances capable of being mixed with, suspended in, and carried by moving water.

The invention consists, primarily, in a series of covered iron or steel bowls connected by pipes made or formed of material suitable for conducting the contents to the first bowl of the series and from said bowl to the second bowl, and so on.

It consists, further, in the employment of an automatic mercury trap or catcher.

The invention will be best understood upon reference to the accompanying drawings, wherein—

Figure 1:
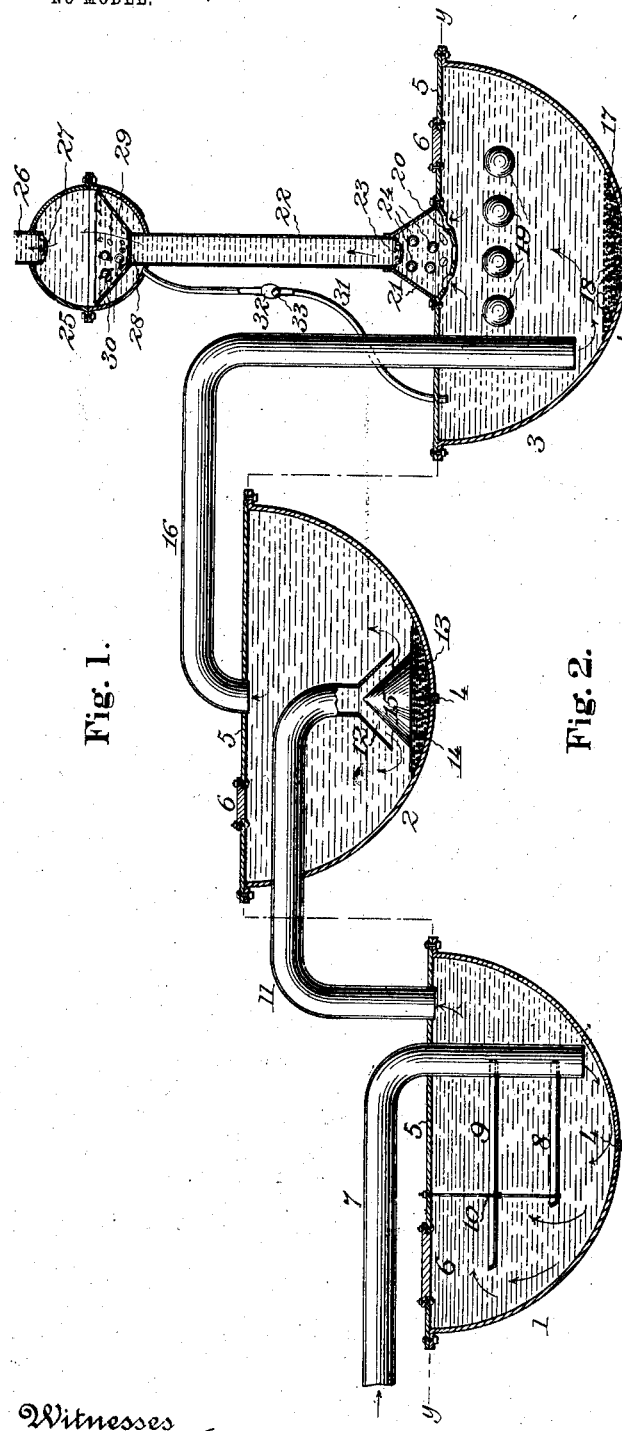
Figure 2:
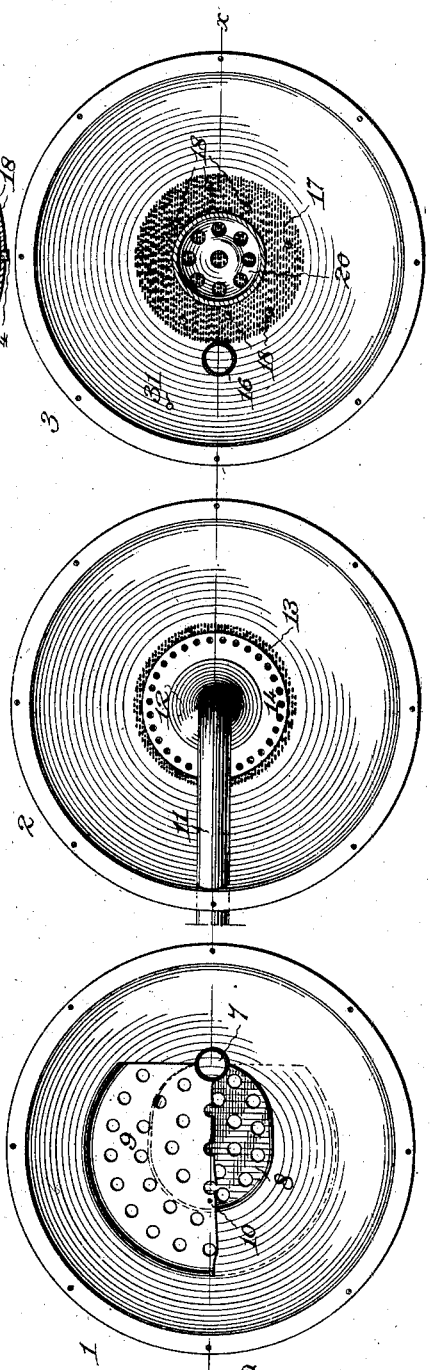

Figure 1 is a vertical sectional view of the apparatus complete, taken on the line $xx$ of Fig. 2; and Fig. 2 is a horizontal section taken on the line $yy$ of Fig. 1.

In the construction illustrated it will be noted that three pans or bowls are employed, as indicated by the reference-numerals 1, 2, and 3. Each bowl is provided at its bottom with a vent-opening, closed by a suitable plug 4, and with a suitable cover 5, which makes when in place a water-tight joint with the flange of the bowl. A hand-hole 6 is also provided in each cover.

Referring more particularly to bowl 1, it will be seen that the material carrying the gold in suspension enters therein through a pipe 7, the lower or discharge end of which comes close to the bottom of the bowl, to one side of the center thereof, so that the material forced in through said pipe 7 is caused to strike the curved bottom of the bowl or pan and is thrown up in a stream to the opposite side. Connected to said pipe and standing in a horizontal plane at one side thereof are two trays or screens 8 and 9, the trays being perforated, as shown in Fig. 2, and supported at their opposite side by rod or bar 10, extending down from the cover. It is to be noted that the upper screen is wider than the lower one and that the edges thereof to the left stand at approximately the same distance from the wall of the bowl. This in a measure serves to direct the current as it passes in through pipe 7 upwardly in the direction indicated by the arrow in bowl 1.

A pipe 11 extends from bowl 1, through the cover thereof, into bowl 2. The exit of pipe 11 from bowl 1 is at one side thereof and, as will be noted, at a point where the water or the like carrying the gold-bearing matter in suspension is in a relatively quiet state, or, in other words, the exit connection is made at a point out of line with the current generated or caused by the discharge from the mouth of pipe 7. The pipe 11 is extended into the bowl, to the center thereof, and at the lower end of the pipe there is formed or provided a conical discharge-mouth 12. In the lower portion of bowl 2 is placed mercury, as indicated by the reference-numeral 13, and placed upon said mercury is an amalgamated-copper float 14, perforated as shown in Fig. 2, said float carrying a conical-shaped member or deflector 15.

The exit-pipe 16 passes centrally from the cover of bowl 2 over and down into bowl 3, entering said bowl, as will be noted, to one side of its center. In the lower portion of this bowl free mercury 17 is placed, in which float solid copper balls 18. Hollow copper balls or spheres 19 are also placed in bowl 3 and by reason of their superior buoyancy will be maintained in the upper part of said bowl or chamber when the material is passing therethrough.

A screen 20, preferably dished or depressed, as shown in Fig. 1, is secured in an opening formed centrally in the cover of bowl 3. Mounted over said screen and secured to the cover is a conical member 21 and extending up from said member is a pipe or conduit 22, in the lower end of which is secured a screen 23. In the chamber formed by the screens 20 23 and the conical member 21 are placed a number of amalgamated-copper balls 24.

Surrounding the upper end of the pipe 22 is a mercury trap or chamber 25, provided with an exit 26, which is protected by a screen 27. The upper end of the pipe 22 is also provided with a screen 28, and a perforated pan 29 extends outwardly from the upper end of the pipe to the inner wall of the chamber 25, said pan being formed of amalgamated copper. Solid amalgamated-copper balls 30 are placed in said pan.

Extending from the bottom of chamber 25 is a pipe 31, which communicates at its lower end with the bowl 3, as shown in Fig. 1. In said pipe there is formed an enlarged chamber 32, in which is mounted and works a ball-valve 33. Normally the valve rests upon its seat and closes the pipe, but rises therefrom to permit free mercury to pass back through to the chamber or pan 3, as will be hereinafter set forth.

The screens herein referred to and also the bowls or pans and the conduit-pipes will be formed of iron or steel or some similar substance not subject to the amalgamating effect of mercury.

The particular arrangement of the pans and connecting pipes herein shown is to be taken as merely illustrative, as it is apparent that they may be arranged in various ways and corresponding or suitable conduits or discharge-pipes provided as occasion or situation may require.

The operation of the apparatus is as follows: The gold-bearing material and the water which conveys it pass into bowl 1 through pipe 7 and being discharged from the lower end of said pipe against the spherical bottom of the bowl are forced upwardly and laterally, following the curve of the bowl until meeting the cover 5, which turns the mixture toward the center over the perforated trays 8 and 9. By this action the heavier and unbroken particles of the material are caused to drop out of the relatively still water over and through the trays 8 and 9 into the lower current, again to be thrown against the cover. This action is repeated over and over until the particles are disintegrated and broken up, releasing and cleaning the gold contained in or attached to them. The material thus treated in bowl 1 passes through pipe 11 into bowl 2, being discharged through the conical orifice or mouth 12, striking the cone 15 and the float 14, thereby spreading and dividing the gold-bearing material suspended in the water over the amalgamating-surface of the cone and the float. The gold-bearing material and water are thence carried through the pipe 16 to bowl 3, the discharge end of the pipe being extended well toward the bottom of the bowl, where the gold-bearing material and water are forced through and in contact with the solid amalgamated balls immersed in the free mercury. Thence it passes around the spherical-shaped bottom of the bowl to the screen 20, located centrally of the cover. In passing to said screen the material must come into contact with the floating amalgamated-copper spheres or balls 19, thus furnishing additional amalgamating-surface to which the finer float gold attaches itself. The gold-bearing material and water pass through the screen up through the conical member or chamber 21 and in so doing come in contact with the solid amalgamated-copper balls 24 contained therein, by which additional amalgamating-surface for the gold is presented and the passage of free mercury obstructed. The material passing up through the pipe 22 enters the chamber or mercury-trap 25, and in so doing comes in contact with the amalgamated-copper pan 29 and the amalgamated-copper spheres 30 resting thereon. By the use of the amalgamated balls 30 employed in the mercury-trap any particles of free and floured mercury are arrested. Any accumulation of mercury upon the solid amalgamated balls in the mercury-trap is collected by the perforated pan and drops down to the lowest point in the mercury-trap, whence it passes into the pipe 31. When a sufficient amount of mercury has collected in the chamber or enlargement 32, located in the pipe, the ball 33 will be raised or floated by the mercury, permitting the mercury to pass around it down into the chamber or pan 3. Upon entering the chamber or pan 3 it will be carried to the bottom thereof by the current set up by the material entering through the pipe 16.

Having thus described my invention, what I claim is—

1. In combination with a closed vessel having a rounded bottom, an inlet-pipe extending into said vessel and discharging against the bottom to one side of the center thereof, screens suspended in said vessel, and an exit-pipe extending from the vessel at that side thereof adjacent to the inlet.

2. In combination with a closed vessel having a rounded bottom, an inlet-pipe extending into said vessel and discharging against the bottom to one side of the center thereof; screens horizontally suspended within said vessel and stopping short of the sides thereof; and an exit-pipe extending from the cover of said vessel at a point therein where the material passing through the vessel is relatively quiescent.

3. In combination with a closed vessel having a rounded bottom; an inlet-pipe 7 passing through the cover of said vessel and discharging near the bottom to one side of the center thereof; screens 8 and 9 attached to the inlet-pipe; a support for the opposite sides of said screens; and an exit-pipe extending through the cover at a point in rear of the inlet-pipe and the screens.

4. In combination with a closed amalgamating vessel adapted to contain a body of mercury; an inlet-pipe with a flaring outlet; a perforated float supporting a cone below said outlet, said float and cone adapted to rest on the mercury below the flaring outlet of the inlet-pipe, said cone and float being composed of amalgamated copper.

5. In combination with a closed amalgamating vessel having mercury placed in the bottom thereof; a float supported by the mercury; a conical deflector carried by said float; and means for delivering material to said deflector.

6. In combination with a closed vessel having a rounded bottom; a body of mercury resting in the lower part of said vessel; an inlet-pipe extending into said vessel and provided with a flaring outlet located in line with the center of said spherical bottom; a perforated amalgamated-copper float resting on the mercury; a conical deflector carried by said float and extending up into the outlet; and an exit-pipe for said vessel.

7. In combination with a closed amalgamating vessel having a rounded bottom; an inlet-pipe extending into said vessel and discharging near the bottom thereof; mercury contained within the lower portion of said vessel; copper balls in said mercury; a screened exit-opening; and hollow copper bodies placed in said vessel.

8. In combination with a closed vessel having a rounded bottom; a pipe extending into the same and discharging at a point near the bottom thereof; a body of mercury in the bottom of said vessel; copper balls in said mercury; a screened outlet for said vessel; hollow copper floats in said vessel; an exit-pipe; a chamber formed intermediate said exit-pipe and the screened opening; and copper balls mounted in said chamber.

9. In combination with a closed vessel, an exit-pipe extending into said vessel and discharging at a point near the bottom thereof; mercury contained in said vessel; copper balls placed in said mercury; hollow copper bodies placed within said vessel; a screened opening for said vessel; an exit-pipe; a chamber formed intermediate said exit-pipe and the discharge-opening; amalgamating-surfaces contained within said chamber; and a mercury-trap in communication with the exit-pipe.

10. In combination with the discharge-pipe of an amalgamating apparatus; a closed chamber; a perforated copper screen mounted within said chamber; a pipe extending from said chamber at a point below said screen; and an automatic float located within said last-mentioned pipe.

11. In combination with the discharge-pipe of an amalgamator; a chamber connected to the upper end thereof; a screen mounted within said chamber around the end of the exit-pipe; a screen over the end of said exit-pipe; copper balls mounted within said chamber and resting on the screen; a pipe leading from the chamber at a point below the screen; and an automatic float located within said pipe.

12. In an amalgating apparatus, the combination of a closed pan or vessel; means contained within said pan for disintegrating the material forced therein; a second closed pan or vessel; a pipe extending from said first vessel into said second vessel; an amalgamating device mounted within said second vessel; a third closed vessel; a pipe extending from said second closed vessel to the third closed vessel; means contained within said third vessel to amalgamate the metal passed therethrough; an exit-pipe for said third vessel; a mercury-trap connected to said exit-pipe; and a return-pipe for the mercury extending from the trap back to said third vessel.

PHILIP H. CARLYON.

Witnesses:
J. N. ROBINSON,
A. P. FITCH.